United States Patent [19]
Vanmaele et al.

[11] Patent Number: 4,985,395

[45] Date of Patent: Jan. 15, 1991

[54] DYE-DONOR ELEMENT FOR THERMAL DYE SUBLIMATION TRANSFER

[75] Inventors: Luc J. Vanmaele, Lochristi; Christian C. Van de Sande, Belsele, both of Belgium

[73] Assignee: Agfa-Gevaert, N.V., Mortsel, Belgium

[21] Appl. No.: 483,765

[22] Filed: Feb. 23, 1990

[30] Foreign Application Priority Data

Feb. 24, 1989 [EP] European Pat. Off. ............ 89200465

[51] Int. Cl.$^5$ ..................... B41M 5/035; B41M 5/26
[52] U.S. Cl. ........................ 503/227; 8/471; 428/195; 428/480; 428/483; 428/500; 428/520; 428/522; 428/913; 428/914
[58] Field of Search ................. 8/471; 428/195, 447, 428/480, 913, 914, 483, 500, 520, 522; 503/227

[56] References Cited

FOREIGN PATENT DOCUMENTS 3071392 3/1988 Japan .................... 503/227
3071393 3/1988 Japan .................... 503/227

*Primary Examiner*—Bruce H. Hess
*Attorney, Agent, or Firm*—A. W. Breiner

[57] ABSTRACT

Dye-donor element for use according to thermal dye sublimation transfer comprising a support having thereon a dye layer containing a dye which has high transfer densities.

9 Claims, No Drawings

DYE-DONOR ELEMENT FOR THERMAL DYE SUBLIMATION TRANSFER

DESCRIPTION

The present invention relates to dye-donor elements for use according to thermal dye sublimation transfer.

Thermal dye sublimation transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, which may be coated on one or both sides with an adhesive or subbing layer, one adhesive or subbing layer being covered with a slipping layer that provides a lubricated surface against which the thermal printing head can pass without suffering abrasion, the other adhesive layer at the opposite side of the support being covered with a dye layer, which contains the printing dyes. Any dye can be used in such a dye layer provided it is easily transferable to the dye-image-receiving layer of the receiver sheet by the action of heat.

Typical and specific examples of dyes for use in thermal dye sublimation transfer have been described in, e.g., EP 209990, EP 209991, EP 216483, EP 218397, EP 227095, EP 227096, EP 229374, EP 257577, EP 257580, JP 84/78894, JP 84/78895, JP 84/78896, JP 84/227490, JP 84/227948, JP 85/27594, JP 85/30391, JP 85/229787, JP 85/229789, JP 85/229790, JP 85/229791, JP 85/229792, JP 85/229793, JP 85/229795, JP 86/41596, JP 86/268493, JP 86/268494, JP 86/268495 and JP 86/284489.

One of the major problems in selecting a dye for thermal dye sublimation transfer printing is good transfer efficiency to produce high maximum density. Many of the dyes proposed for use in thermal dye sublimation transfer are not suitable because they yield inadequate transfer densities at reasonable coating coverages.

It is an object of the present invention to provide dyes which have high transfer densities for use in thermal dye sublimation transfer printing.

This and other objects are achieved in accordance with the present invention by providing a dye-donor element for use according to thermal dye sublimation transfer, said dye-donor element comprising a support having thereon a dye layer containing a dye characterized in that said dye corresponds to general formula (I)

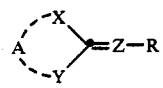

wherein

X and Y each independently represent $C=O$, $C=S$, $SO_2$, $C=U$ with U a group derived from an electronegative active methylene group such as $C(CN)_2$, $C(CN)(COOR_1)$, $CBrCOOR_1$, $C(COOR_1)(COOR_1')$, $C(COR_1)(COR_1')$ wherein $R_1$ and $R_1'$ each independently represent hydrogen or an unsubstituted or substituted alkyl group or an unsubstituted or substituted aryl group;

A represents the atoms necessary to complete a 5- or 6-membered unsubstituted or substituted ring including such ring with an aromatic nucleus fused-on such as indane;

Z represents N or $CR_2$ wherein $R_2$ represents H, CN, $COOR_1''$, $NR_5'R_6'$, $OR_7'$, $SR_7'$, an electronegative active methylene group such as $CH(CN)_2$, $CH(CN)(COOR_1'')$ wherein $R_1''$ represents hydrogen or an unsubstituted or substituted alkyl group or an unsubstituted or substituted aryl group and wherein $R_5'$ and $R_6'$ each independently represent hydrogen, an unsubstituted or substituted alkyl group or an unsubstituted or substituted aryl group or $R_5'$ and $R_6'$ may be combined together with the nitrogen to which they are attached to form a heterocyclic ring system and wherein $R_7'$ represents hydrogen or an unsubstituted or substituted alkyl group or an unsubstituted or substituted aryl group or $R_2$ may be combined with R so that Z—R represents

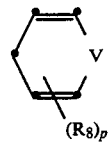

wherein V represents O, S, Se, Te, $NR_9$ wherein $R_9$ represents hydrogen, an unsubstituted or substituted alkyl group, an unsubstituted or substituted aryl group or an amino group, and wherein $R_8$ represents an unsubstituted or substituted alkyl group or an unsubstituted or substituted aryl group, and wherein p represents 1, 2, 3 or 4 (when p equals 2, 3 or 4 the $R_8$ groups may be the same or different);

R represents $Ar—NR_3R_4$, $Ar'—N=N—Ar—NR_3R_4$, $Het—N=N—Ar—NR_3R_4$, $Het—N=CR_2'—NR_5R_6$, $Ar—(OR_7)_m$ wherein Ar and Ar' each independently represent an unsubstituted or substituted aryl nucleus including fused aromatic nuclei and wherein Het represents an unsubstituted or substituted 5-membered or 6-membered heterocyclic ring such as thiazole, oxazole, thiadiazole, 4-chlorooxazole, 4-chlorothiazole and wherein $R_3$ and $R_4$ each independently represent a hydrogen atom, an unsubstituted or substituted alkyl group or an unsubstituted or substituted aryl group or $R_3$ and $R_4$ may be combined together with the nitrogen to which they are attached to form a heterocyclic ring system or $R_3$ and/or $R_4$ may be combined with Ar to form a heterocyclic ring system and wherein $R_2'$ has one of the significations given for $R_2$ and wherein $R_5$ and $R_6$ have one of the significations given for $R_5'$ and $R_6'$ and wherein $R_7$ has one of the significations given for $R_7'$ wherein m represents 1, 2 or 3 (when m equals 2 or 3 the $R_7$ groups may be the same or different) or R may be combined with $R_2$ (in case Z is $CR_2$) so that Z—R represents

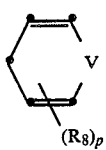

wherein V represents O, S, Se, Te, NR$_9$ wherein R$_9$ represents hydrogen, an unsubstituted or substituted alkyl group, an unsubstituted or substituted aryl group or an amino group, and wherein R$_8$ represents an unsubstituted or substituted alkyl group or an unsubstituted or substituted aryl group, and wherein p represents 1, 2, 3 or 4 (when p equals 2, 3 or 4 the R$_8$ groups may be the same or different).

Particularly preferred dyes according to the present invention are those wherein X and Y each independently represent C=O or C=C(CN)$_2$ and wherein A represents indane.

By appropriate selection of substituents, the dyes employed in this invention may be of yellow, magenta or cyan hue.

Compounds included within the scope of the present invention include the following.

TABLE 1

Yellow Dye Compounds

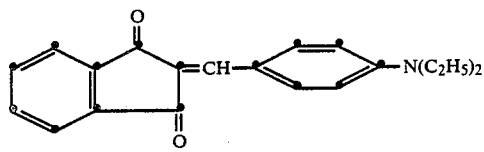 Y1

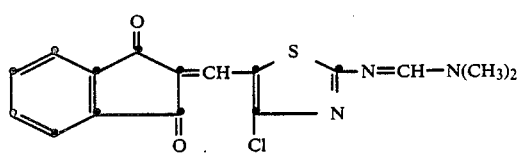 Y2

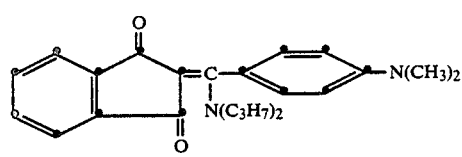 Y3

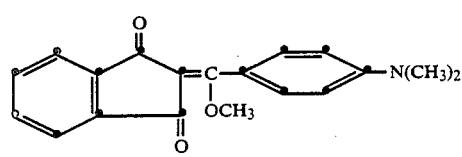 Y4

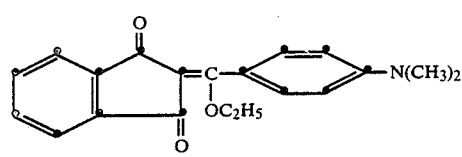 Y5

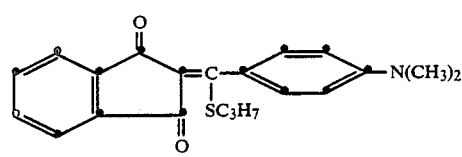 Y6

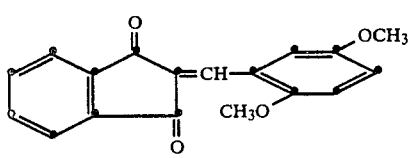 Y7

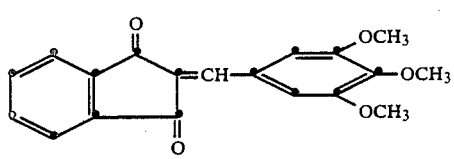 Y8

TABLE 1-continued
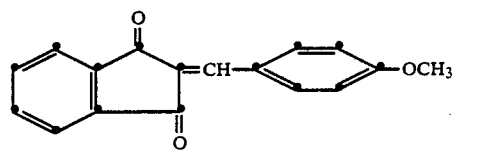 Y9
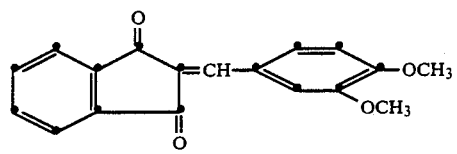 Y10
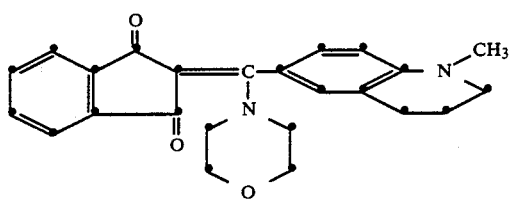 Y11
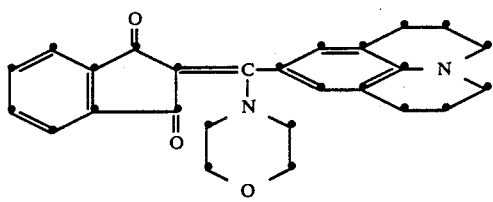 Y12
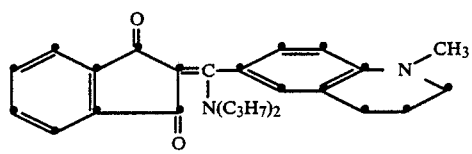 Y13
Magenta Dye Compounds
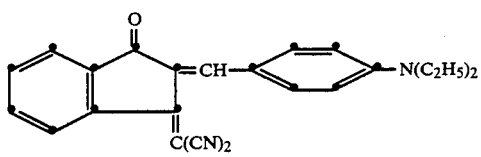 M1
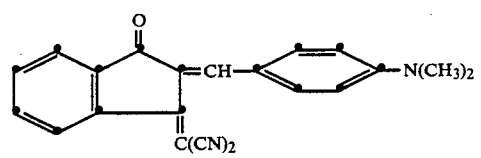 M2
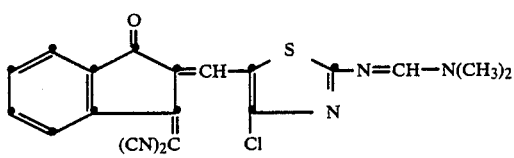 M3
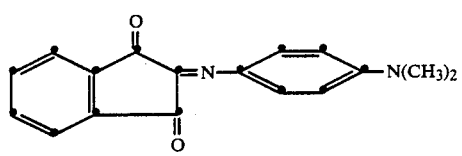 M4

TABLE 1-continued
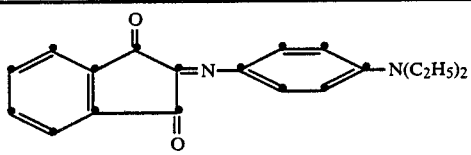 M5
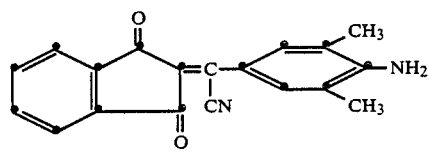 M6
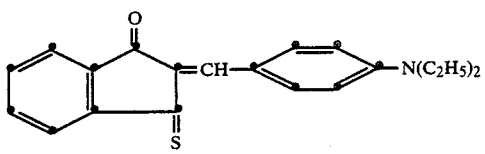 M7
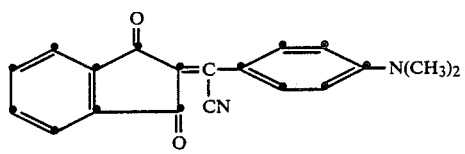 M8
Cyan Dye Compounds
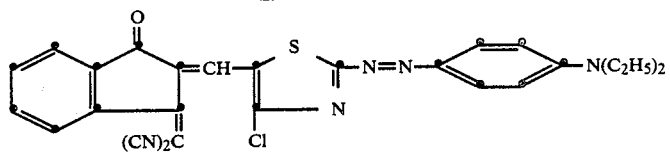 C1
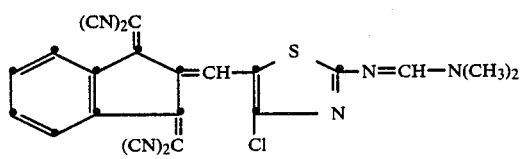 C2
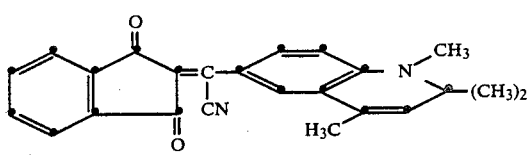 C3
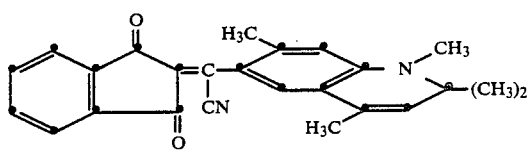 C4
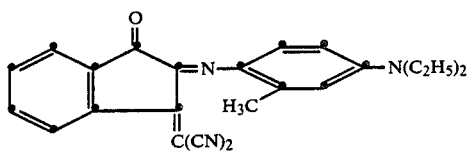 C5
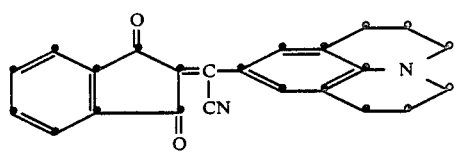 C6

TABLE 1-continued

| | |
|---|---|
| 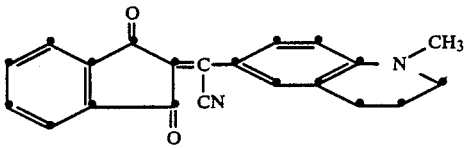 | C7 |
| 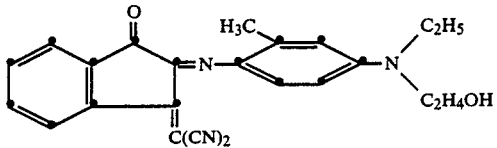 | C8 |
| 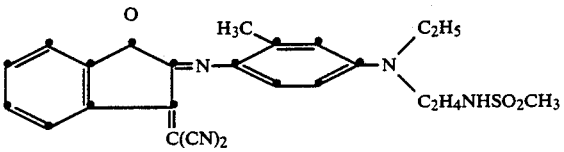 | C9 |
| 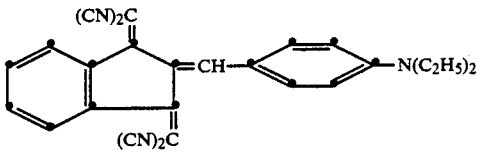 | C10 |
| 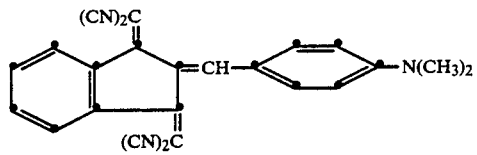 | C11 |
| 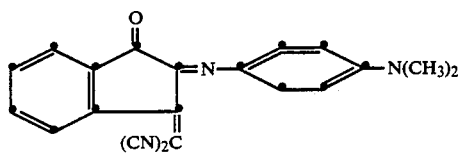 | C12 |
| 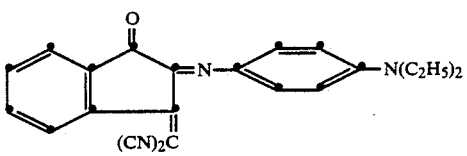 | C13 |
| 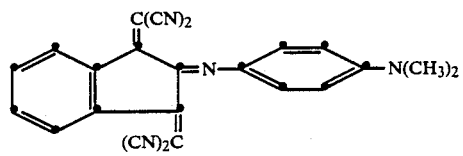 | C14 |
| 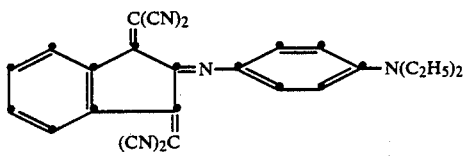 | C15 |

The dyes listed in the above table may be prepared by synthetic procedures similar to those described in J. Chem. Soc., Perkin Trans. II, 1987, pages 815 to 818, and in J. Chem. Soc., Chem. Comm., 1986, pages 1639 to 1640.

By way of example some syntheses are described below.

Synthesis of dye Y10

3 g (0.0205 mole) of indane-1,3-dione and 3.41 g (1 eq.) of 3,4-dimethoxybenzaldehyde were added to 75 ml of ethanol and refluxed. Thereafter the reaction mixture was cooled to room temperature and left overnight. The reaction product crystallized, was filtered, washed with methanol and dried at 40° C. 4.3 g of dye Y10 was obtained.

Synthesis of dye M5

2.0 g (11.2 mmole) of 2,2-dihydroxy-indane-1,3-dione was added to 15 ml of toluene and azeotropically dried by refluxing. Hereto was added dropwise a solution of 2.9 g (1.3 eq.) of p-diethylaminoaniline in 10 ml of toluene. At the end of the reaction (monitoring by thin layer chromatography with dichloromethane/methanol 95:5 as eluent) the reaction mixture was concentrated by evaporation. 3.1 g of crude reaction product was obtained. After purification by column chromatography (eluent dichloromethane) 1.6 g of dye M5 was obtained.

Synthesis of dye M8

A mixture of 210 g (1.18 mole) of 2,2-dihydroxy-indane-1,3-dione in 1 l of dry toluene was heated to reflux. 124.6 g (1.6 eq.) of melted malonitrile was added to the boiling mixture in 30 minutes. Water was distilled off and thereafter the reaction mixture was cooled. The precipitate was filtered, washed with toluene and dried at 50° C. 228.8 g of 2-dicyanomethylene-indane-1,3-dione was obtained.

In a 2 l reaction flask were introduced: 37.44 g (0.18 mole) of 2-dicyanomethylene-indane-1,3-dione, 23 ml (1.14 eq.) of dimethylaminobenzene and 1.2 of n-butanol. The reaction mixture was heated to 75° C. and was stirred for 1 hour at 75° C. Thereafter the reaction mixture was cooled, the precipitate was filtered, washed with isopropanol and dried at 50° C. 53.4 g of crude reaction product were obtained. After purification by recrystallization (ethanol/dichloromethane mixture) 44.9 g of pure 2-dicyano-p-dimethylaminophenylmethane-indane-1,3-dione was obtained.

7 g (0.021 mole) of 2-dicyano-p-dimethylaminophenylmethane-indane-3-dione. 140 ml of toluene and 3.3 ml (1.1 eq.) of triethylamine were refluxed for 2 hours. Thereafter the reaction mixture was cooled, diluted with dichloromethane and subsequently washed with 100 ml of water, 100 ml of 0.1N hydrogen chloride, 100 ml of saturated sodium chloride. The organic phase was dried on magnesium sulfate. After filtering the magnesium sulfate the filtrate was evaporated to dryness and dried under vacuum. 6.28 g of crude reaction product was obtained. After purification by recrystallization (acetic anhydride) 4.0 g of pure dye M8 was obtained.

A particular type of dye included within the scope of the present invention is a dye wherein Z is $CR_2$ and wherein $R_2$ is combined with R so that Z—R represents

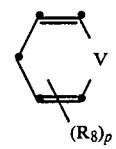

wherein

V represents O, S, Se, Te, $NR_9$ wherein $R_9$ represents hydrogen, an unsubstituted or substituted alkyl group such as a carboxyalkyl group or a hydroxyalkyl group, an unsubstituted or substituted aryl group or an amino group;

$R_8$ represents an unsubstituted or substituted alkyl group or an unsubstituted or substituted aryl group;

p represents 1, 2, 3 or 4 (when p equals 2, 3 or 4 the $R_8$ groups may be the same or different).

Preferably V represents O or $NR_9$.

Examples of these dyes are listed in table 2 below.

TABLE 2

Yellow Dye Compounds

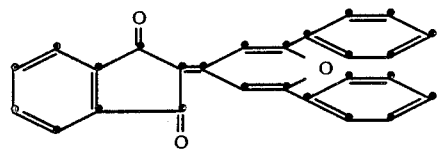 PY1

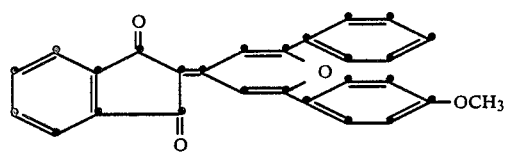 PY2

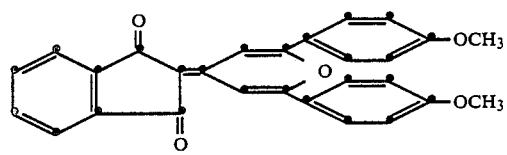 PY3

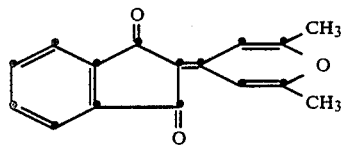 PY4

TABLE 2-continued
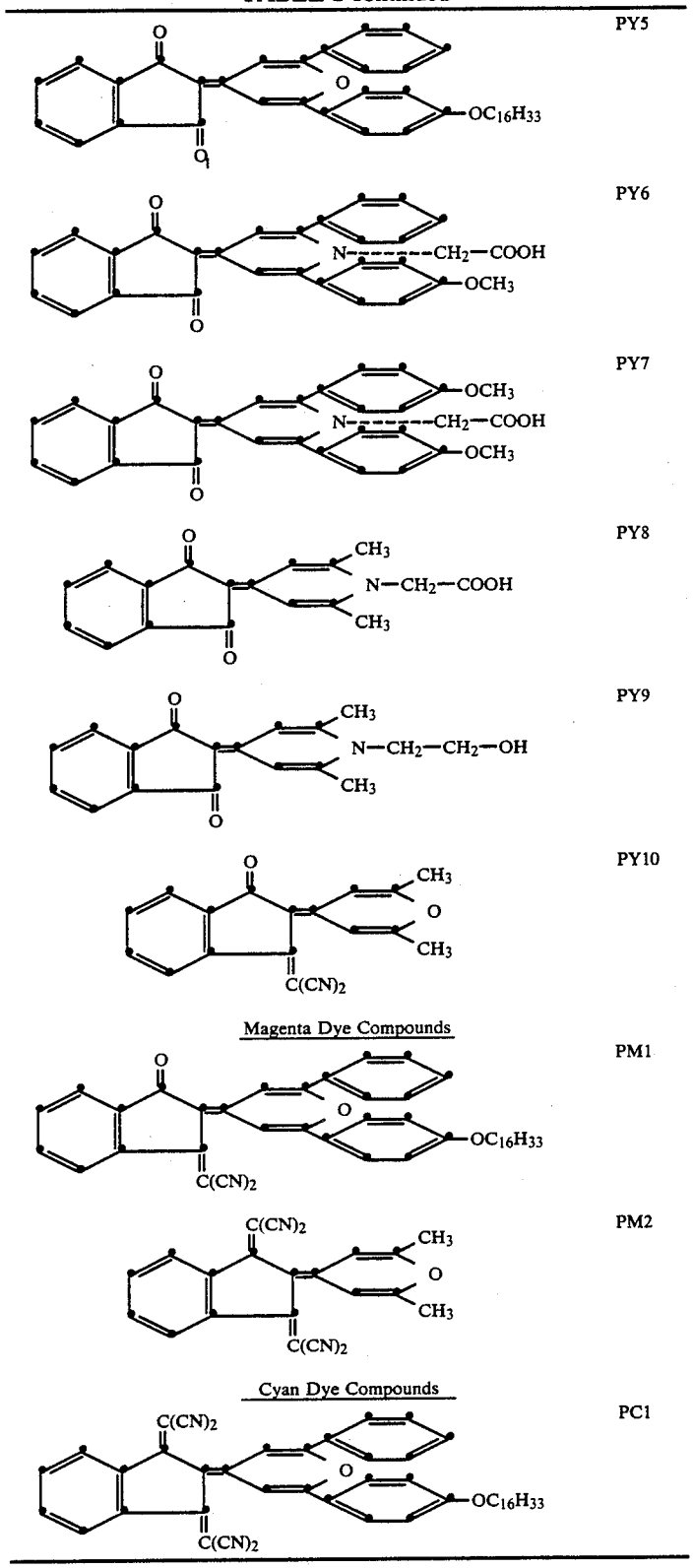
Syntheses of some dyes listed in table 2 are described below by way of example. The other dyes can be prepared by analoguous procedures.
The preparation method for substituted pyrones is described by M. L. Miles, T. M. Harris and C. R. Hauser in Organic Synthesis, collective volume 5, pages 718 to 723 and in J. Org. Chem., Vol. 30 (1965), page 1007.

Synthesis of dye PY1

75 g (2.5 mole, 5 eq.) of sodium hydride were added to 1200 ml of dry ethylene glycol dimethylether. To this mixture was added dropwise under nitrogen atmosphere and reflux: 29 g (0.5 mole. 1 eq., 36.7 ml) of acetone and 204 g (1.5 mole, 3 eq., 186.5 ml) of methylbenzoate in 500 ml of ethylene glycol dimethylether. The reaction mixture was refluxed for 5 hours. Thereafter ethylene glycol dimethylether was distilled off under vacuum. 750 ml of diethylether was added. The sodium hydride was neutralized at 0° C. with 1 l of water. The ether phase was separated and extracted twice with 1 l of water and once with 1 l of 1% sodium hydroxide. The water phase was poured out in 2000 g of ice and 500 ml of concentrated hydrogen chloride. This mixture was extracted with dichloromethane, washed with saturated sodium chloride, dried on sodium sulfate and concentrated by evaporation. After drying under vacuum 56.9 g of compound (a.i) was obtained.

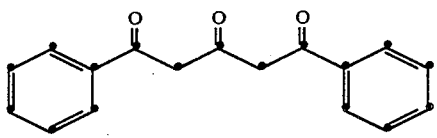
(a.i)

56.9 g of compound (a.i) was added in small portions to 180 ml of concentrated sulfuric acid at 0° C. while stirred and cooled. After 1 hour of stirring at 0° C. the reaction mixture was poured out into 6 l of cold water. After stirring for 1 hour the precipitate was filtered, washed with water and with 10% sodium hydrogen carbonate till pH 7 was reached and thereafter once again with water. After drying at 50° C. 49.6 g of compound (a.ii) was obtained.

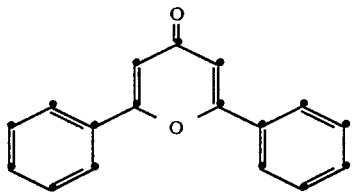
(a.ii)

13 g (0.0524 mole) of purified (by recrystallization using ethanol as solvent) compound (a.ii) and 7.6 g (1 eq.) of indane-1,3-dione were dissolved in 220 ml of acetic anhydride at 110° C. The reaction mixture was stirred at 110° C. for 24 hours and thereafter cooled to room temperature and further cooled on an ice bath. The precipitate was filtered, washed with water and with methanol/water 1:1 mixture. After drying at 50° C. 15.7 g of dye PY1 was obtained.

Synthesis of dye PY2

15 g (0.5 mole) of sodium hydride was suspended into 250 ml of dry glyme. To this mixture was added slowly under nitrogen atmosphere and reflux at 85° C.: 16.2 g (0.1 mole) of 1-benzoylacetone and 24.9 g (0.15 mole) of p-anisic acid methyl ester in 100 ml of glyme. The reaction mixture was refluxed for 6 hours and thereafter cooled to 40° C. The ethylene glycol dimethylether was distilled off under vacuum. 400 ml of diethylether was added and the mixture was cooled to 0° C. under nitrogen atmosphere. 200 ml cf water was added dropwise. The ether phase was separated and extracted twice with water and once with 1% sodium hydroxide. The water phases were poured out in a mixture of ice and hydrogen chloride. The mixture was stirred until all the ice was melted. The precipitate was filtered, washed to neutral and washed with isopropanol and dried under vacuum. 14.8 g of compound (b.i) was obtained.

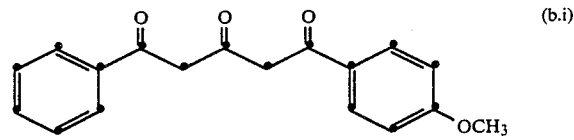
(b.i)

14 g (0.0473 mole) of compound (b.i) was added in small portions to 45 ml of concentrated sulfuric acid at 0° C. while stirring. After 1 hour of stirring at 0° C. the mixture was poured out into 2 l of water. Sodium hydrogen carbonate was added in small portions till pH 8 was reached. The precipitate was filtered, washed with water and dried under vacuum. 11.5 g of compound (b.ii) was obtained. Compound (b.ii) was purified by recrystallization (solvent ethanol); 9.2 g remained.

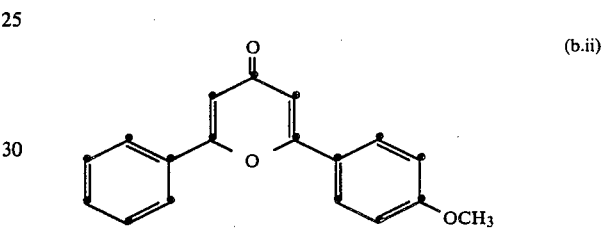
(b.ii)

8.8 g (0.029 mole) of purified compound (b.ii) and 4.2 g (1 eq.) of indane-1,3-dione were dissolved in 122 ml of acetic anhydride at 110° C. The solution was stirred at 110° C. The reaction was followed by thin layer chromatography (eluent dichloromethane/methanol 98:2). A further amount of 0.1 eq. of indane-1,3-dione was added. After completion of the reaction (24 hours) the reaction mixture was cooled to room temperature and further cooled on an ice bath. The precipitate was filtered, washed with water and with methanol/water 1:1 mixture. After drying at 50° C. 124 g of compound PY2 was obtained.

Synthesis of dye PY5

6.17 g (5 eq.) of sodium hydride suspension was added to 75 ml of dry glyme. This mixture was heated to reflux under nitrogen atmosphere. A solution of 5.0 g (30.8 mmole) of 1-benzoylacetone and 17.5 g (1.5 eq.) of p-hexadecyloxy methyl benzoate in 80 ml of glyme was added dropwise to this mixture. The reaction mixture was refluxed for 6 hours. Thereafter the mixture was cooled and the glyme was distilled off under vacuum. The resulting reaction mixture was cooled to 0° C. under nitrogen atmosphere. 200 ml of diethylether was added and 100 ml of water was added dropwise. The reaction mixture was poured out in 500 g of ice and 100 ml of concentrated hydrogen chloride. The mixture was stirred until all the ice was melted. The precipitate was filtered, washed till neutral and washed with ethanol and dried. 21 g of crude reaction product was obtained. After purification by recrystallization (solvent ethyl acetate) 11.1 g of compound (c.i) was obtained.

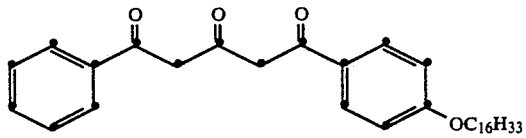

(c.i)

50 ml of concentrated sulfuric acid was cooled to 0° C. 10 g (19.7 mmole) of compound (c.i) was added in small portions under efficient stirring. After 1 hour of stirring at 0° C. the mixture was poured out into 2 l of ice water. The mixture was brought to pH 8 by adding approximately 280 g of sodium hydrogen carbonate. The precipitate was filtered, washed with water and ethanol and dried under vacuum. 9.6 g of compound (c.ii) was obtained.

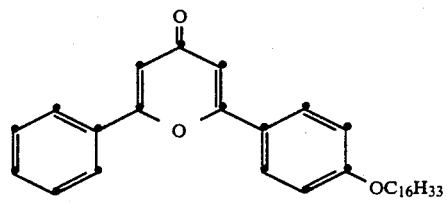

(c.ii)

1.0 g (6.8 mmole) of compound (c.ii) and 3.34 g (1 eq.) of indane-1,3-dione were added to 25 ml of acetic anhydride. The mixture was heated to 120° C. while stirring and kept for 2 hours at this temperature while stirring. The reaction mixture was left overnight. The precipitate was filtered and washed neutral with methanol. After drying 2.9 g of dye PY5 was obtained.

Synthesis of dye PY6

1 g (2.293 mmole) of compound PY2, 0.6 g (3.3 eq.) of glycine and 0.3 g of potassium carbonate were added to 30 ml of ethanol and 15 ml of dimethylformamide at 80° C. The mixture was refluxed for 72 hours. Thereafter 200 ml of water were added, the mixture was acidified while stirring. The precipitate was filtered, washed with water and dried at 50° C. 0.85 g of dye PY6 was obtained.

Synthesis of dye PM1

1.0 g (5.12 mmole) of compound (c.ii) and 2.5 g (1 eq.) of 3-dicyanomethylene-indane-1-one were added to 25 ml of acetic anhydride and heated to 120° C. The mixture was stirred for 1 hour at 120° C. and thereafter left to stand whereby the reaction product crystallized. The precipitate was filtered, washed with methanol and dried at 50° C. 2.5 g of dye PM1 was obtained.

Synthesis of dye PC1

1.0 g (4.13 mmole) of 1,3-bisdicyanomethylene-indane and 2.02 g (1 eq.) of compound (c.ii) were added to 25 ml of acetic anhydride and heated to 120° C. for 1 hour. Thereafter the mixture was left overnight whereby the reaction product crystallized. The precipitate was filtered, washed with methanol and dried at 50° C. 2.25 g of compound PC1 was obtained.

The absorption maxima ($\lambda_{max}$) and molar extinction coefficients ($\epsilon$) of some of the dyes listed above in tables 1 and 2 are shown in table 3.

TABLE 3

| dye | solvent | concentration mg/l | $\lambda$max nm | $\epsilon$ mol$^{-1}$ cm$^{-1}$ l |
|---|---|---|---|---|
| Y1 | methanol | 3.04 | 489 | 80465 |
| Y2 | NMP (a) | 5.15 | 489 | 51405 |
| Y7 | methanol | 5.10 | 430 | |
| Y8 | methanol | 5.00 | 385 | 27670 |
| Y9 | methanol | 5.00 | 382 | 36854 |
| Y10 | methanol | 5.00 | 404 | 32458 |
| M1 | ethanol | 4.02 | 562 | 61555 |
| M3 | NMP (a) | 5.15 | 559 | 44406 |
| M6 | ethanol | 5.20 | 559 | 24450 |
| M8 | ethanol | 5.20 | 570 | 34555 |
| C6 | dichloromethane | 5.00 | 618 | 50268 |
| C7 | ethanol | 5.10 | 593 | 36080 |
| C8 | ethanol | 5.20 | 689 | 34190 |
| C9 | ethanol | 5.00 | 686 | 32922 |
| C12 | dichloromethane | 5.00 | 605 | 48052 |
| C13 | methanol | 5.00 | 610 | 47153 |
| PM1 | dichloromethane | 5.40 | 526 | 38979 |
| PM2 | methanol | 5.20 | 553 | 23625 |

(a) NMP = N-methyl pyrrolidinone

The dye layer is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 $\mu$m, preferably 0.4 to 2.0 $\mu$m, and the amount ratio of dye compared to binder is between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacryiamide; polymers and copolymers derived from acrylates and acrylates derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic.

The coating layer may also contain other additives, such as curing agents, preservatives, etc., these and other ingredients being described more fully in EP 133011, EP 133012, EP 111004 and EP 279467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive or subbing layer if desired.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer In the donor element thus perform a dual function, hence are referred to as dye-barrier/subbing layers.

Preferably the reverse side of the dye-donor element can be coated with a slipping layer to prevent the printing bead from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. Nos. 4,567,113, 4,572,860, 4,717,711.

The dye-donor element employed in certain embodiments of the invention may be used in sheet form or in a continuous roll or ribbon. If a continuous roll or ribbon is employed. It may have only one dye thereon or may have alternating areas of different dyes, such as cyan, magenta. yellow, black as disclosed in U.S. Pat. No. 4,451,830. Thus, one-, two-, three- or four-color elements (or higher numbers also) are included within the scope of the invention.

The support for the receiver sheet that is used with the dye-donor element may be a transparent film of e.g. polyethylene terephthalate, a polyether sulfone, a polyamide, a cellulose ester or a polyvinyl alcohol-co-acetal. The support may also be a reflective one such as baryta-coated paper, polyethylene-coated paper or white polyester i.e. white-pigmented polyester.

To avoid poor adsorption of the transferred dye to the support of the receiver sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. Suitable dye-receiving layers have been described in e.g. EP 133011, EP 133012, EP144247, EP227094, EP 228066.

In order to improve the light resistance and other stabilities of recorded images, UV absorbers, singlet oxygen quenchers such as HALS-compounds (Hindered Amine Light Stabilizers) and/or antioxidants may he incorporated into the receiving layer.

The dye layer of the dye-donor element or the dye-image-receiving layer of the receiver sheet may also contain a releasing agent that aids In separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished by heating for about several milliseconds at a temperature of 400° C.

In addition to thermal heads, laser light, infrared flash or heated pens can be used as the heat source for supplying heat energy. Thermal printing heads that can be used to transfer dye from the dye-donor elements of the present invention to a receiver sheet are commercially available.

When the process is only performed for a single color, then a monochrome dye transfer image is obtained. A multicolor image can be obtained by using a donor element containing three primary color dyes and sequentially performing the process steps described above for each color. The above sandwich of donor element and receiver sheet is formed on three occasions during the time when heat is applied by the thermal printing head. After the first dye has been transferred, the elements are peeled apart. A second dye-donor element (or another area of the donor element with a different dye area) in then brought in register with the dye-receiving element and the process repeated. The third color and optionally further colors are obtained in the same manner.

The following examples are provided to illustrate the invention.

EXAMPLES

A dye-donor element was prepared as follows:

A solution of 0.5% dye as identified in table 4 and 0.5% of a binder, the nature of which is identified below, in tetrahydrofuran was prepared. From this solution a layer having a wet thickness of 100 μm was coated on 5 μm polyethylene terephthalate film provided with a subbing layer containing 2.5% co-vinylidenechloride-acrylonitrile in acetone (wet thickness 10 μm). The resulting layer was dried by evaporation of the solvent.

To avoid sticking of the dye-donor element to the thermal printing head the rear side of the polyethylene terephthalate support was coated with a solution comprising 5% co-styrene-acrylonitrile and 0.1% of a 1% solution of polysiloxane polyether copolymer sold under the trade mark TEGOGLIDE 410 by T. H. Goldschmidt, in acetone. From this solution a layer having a wet thickness of 100 μm was coated. The resulting layer was also dried by evaporation of the solvent.

A commercially available Hitachi material (VY-S100A paper ink set) was used as receiving element.

The dye-donor element was printed in combination with the receiving element in a Hitachi color video printer VY-100A.

The maximum color density of the recorded dye image on the receiving sheet ($D_{max}$) was measured by means of a Macbeth densitometer RD919 in Status A mode.

The experiment was repeated for each of the dye/binder combinations identified in Table 4.

The results are listed in the following table wherein
B1 is co-styrene-acrylonitrile,
B2 is cellulose acetate propionate,
B3 is polyester and
B4 is co-vinyl-n-butyral-vinylacetal-vinylalcohol.

TABLE 4

| dye | binder | $D_{max}$ |
|---|---|---|
| Y1 | B1 | 1.94 |
| Y1 | B2 | 1.94 |
| Y1 | B3 | 2.24 |
| Y1 | B4 | 2.20 |
| Y7 | B1 | 1.89 |
| Y8 | B1 | 1.02 |
| Y10 | B1 | 1.05 |
| M1 | B1 | 2.49 |
| M8 | B1 | 1.54 |
| M8 | B2 | 1.23 |
| M8 | B3 | 1.69 |
| M8 | B4 | 1.13 |
| C6 | B1 | 2.10 |
| C6 | B2 | 1.79 |
| C6 | B3 | 2.18 |
| C6 | B4 | 2.36 |
| C7 | B1 | 1.12 |
| C8 | B1 | 1.65 |
| C9 | B1 | 1.01 |
| C10 | B1 | 1.20 |
| C13 | B1 | 2.23 |
| C13 | B2 | 1.76 |
| C13 | B3 | 2.22 |
| C13 | B4 | 2.34 |
| PY1 | B1 (a) | 1.31 |
| PY10 | B1 | 1.94 |
| PM1 | B1 | 1.20 |
| PM2 | B1 | 1.70 |

(a) dichloromethane is used instead of tetrahydrofuran

We claim:
1. Dye-donor element for use according to thermal dye sublimation transfer comprising a support having thereon a dye layer containing a binder and a dye corresponding to general formula (I)

wherein
X and Y each independently represent C=O, C=S, SO$_2$, C=U with U a group derived from an electronegative active methylene group;
A represents the atoms necessary to complete a 5- or 6-membered unsubstituted or substituted ring including such ring with an aromatic nucleus fused-on;

Z represents N or CR$_2$ wherein R$_2$ represents H, CN, COOR$_1$'', NR$_5$'R$_6$', OR$_7$', SR$_7$', or an electronegative active methylene group, wherein R$_1$'' represents hydrogen or an unsubstituted or substituted alkyl group or an unsubstituted or substituted aryl group and wherein R$_5$' and R$_6$' each independently represent hydrogen, an unsubstituted or substituted alkyl group or an unsubstituted or substituted aryl group or R$_5$' and R$_6$' may be combined together with the nitrogen to which they are attached to form a heterocyclic ring system and wherein R$_7$' represents hydrogen or an unsubstituted or substituted alkyl group or an unsubstituted or substituted aryl group, or R$_2$ may be combined with R so that Z—R represents

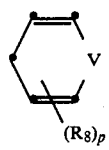

wherein V represents O, S, Se, Te, NR$_9$ wherein R$_9$ represents hydrogen, an unsubstituted or substituted alkyl group, an unsubstituted or substituted aryl group or an amino group, and wherein R$_8$ represents an unsubstituted or substituted alkyl group or an unsubstituted or substituted aryl group, and wherein p represents 1, 2, 3 or 4 (when p equals 2, 3 or 4 the R$_8$ groups may be the same or different);

R represents Ar—NR$_3$R$_4$, Ar'—N=N—Ar—NR$_3$R$_4$, Het—N=N—Ar—NR$_3$R$_4$, Het—N=CR$_2$'—NR$_5$R$_6$ or Ar—(OR$_7$)$_m$, wherein Ar and Ar' each independently represent an unsubstituted or substituted aryl nucleus including fused aromatic nuclei and wherein Het represents an unsubstituted or substituted 5-membered or 6-membered heterocyclic ring and wherein R$_3$ and R$_4$ each independently represent hydrogen, an unsubstituted or substituted alkyl group or an unsubstituted or substituted aryl group or R$_3$ and R$_4$ may be combined together with the nitrogen to which they are attached to form a heterocyclic ring system or R$_3$ and/or R$_4$ may be combined with Ar to form a heterocyclic ring system and wherein R$_2$' has one of the significations given for R$_2$ and wherein R$_5$ and R$_6$ have one of the significations given for R$_5$' and R$_6$' and wherein R$_7$ has one of the significations given for R$_7$' and wherein m represents 1, 2 or 3 (when m equals 2 or 3 the R$_7$ groups may be the same or different), or R may be combined with R$_2$ (in case Z is CR$_2$) so that Z—R represents

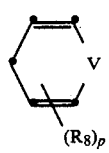

wherein V represents O, S, Se, Te, NR$_9$ wherein R$_9$ represents hydrogen, an unsubstituted or substituted alkyl group, an unsubstituted or substituted aryl group or an amino group, and wherein R$_8$ represents an unsubstituted or substituted alkyl group or a unsubstituted or substituted aryl group, and wherein p represents 1, 2, 3 or 4 (when p equals 2, 3 or 4 the $R_8$ groups may be the same or different).

2. Dye-donor element according to claim 1, wherein X and Y each independently represent C=O or C=C(CN)$_2$ and A represents the atoms necessary to complete an indane ring.

3. Dye-donor element according to claim 1, wherein V represents O or NR$_9$.

4. Dye-donor according to claim 1, wherein said binder is chosen from the group consisting of co-styrene-acrylonitrile, cellulose acetate propionate, polyester, co-vinyl-n-butyral-vinylacetal-vinylalcohol.

5. Dye-donor element according to claim 4, wherein the amount ratio of dye to binder is between 9:1 and 1:3 by weight.

6. Dye-donor element according to claim 1, wherein the support is polyethylene terephthalate.

7. Dye-donor element according to claim 1, wherein the rear side of the support is coated with a slipping layer containing a lubricating material.

8. Dye-donor element according to claim 7, wherein the lubricating material is a polysiloxane polyether copolymer.

9. Dye-donor element according to claim 1, wherein the support is provided on one or both sides with a subbing layer.

* * * * *